W. S. LANGFORD.
BELT FASTENER.
APPLICATION FILED OCT. 6, 1915.
1,202,541.
Patented Oct. 24, 1916.
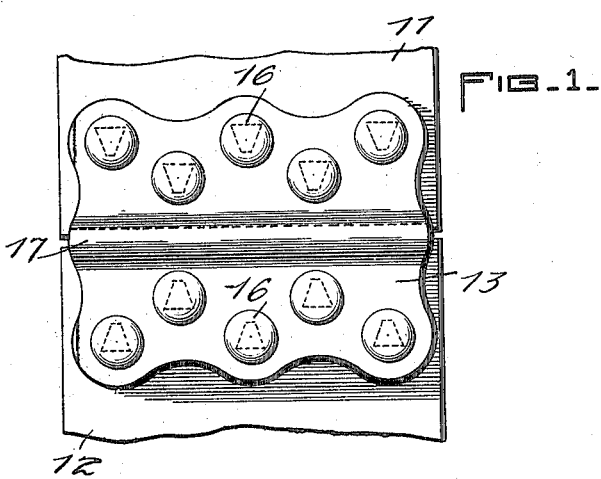
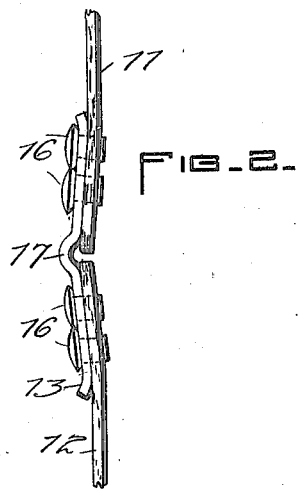
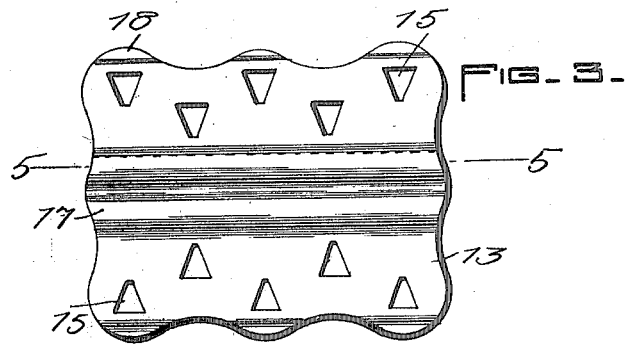
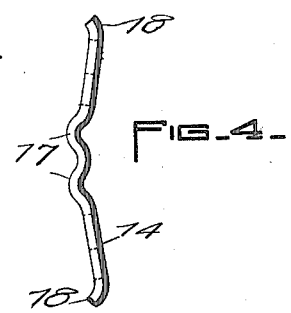
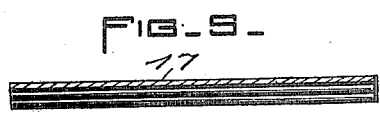
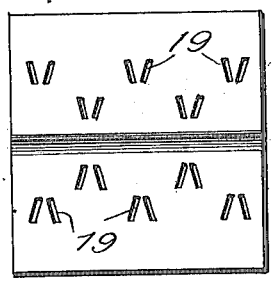
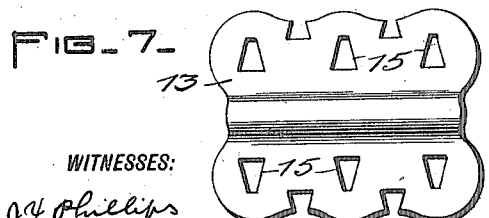
WITNESSES:
J. Y. Phillips
E. L. Mueller
INVENTOR
WILLIAM S. LANGFORD,
BY Munn & Co
ATTORNEYS

UNITED STATES PATENT OFFICE.

WILLIAM S. LANGFORD, OF BALTIMORE, MARYLAND.

BELT-FASTENER.

1,202,541.  Specification of Letters Patent.  Patented Oct. 24, 1916.

Original application filed May 1, 1915, Serial No. 25,188. Divided and this application filed October 6, 1915. Serial No. 54,373.

*To all whom it may concern:*

Be it known that I, WILLIAM S. LANGFORD, a citizen of the United States, and a resident of the city of Baltimore, in the State of Maryland, have invented an Improvement in Belt-Fasteners, of which the following is a specification.

This invention relates to belts for general transmission and more particularly to novel fasteners for the meeting ends thereof.

The result to be obtained, in the construction of belt fasteners, is the provision of one which will be of the desired strength in order to overcome the strain thereon when passing over the belt pulley and also one which will be of sufficient flexibility to adapt itself to the contour of the pulley to a degree which will not only absorb shocks but also prevent accidental displacement of the belt.

Heretofore, some fasteners have been constructed comprising a flat plate of cast or sheet metal. This method is open to the objection that a rigid joint is formed which causes the belt to crack and subsequently break at the heel of the plate. Other fasteners have been made, with an object to overcoming the above objection, consisting of hinged members which have been successful, to a degree, in relieving the strain at the points of fastening to the belt; but, in practice, fasteners of this character have proven unsatisfactory for the reason that the strain upon the hinge pin is so great as to cause unnecessary wear thereon and bend the same out of alinement with the hinge openings of the several members.

The present invention contemplates overcoming the objections noted by constructing a belt fastener of suitable cast or sheet metal provided with one or more corrugations or arched portions which impart greatly increased flexibility to the fastener as a whole, and particularly at the portions adjacent the said corrugations or arched portions, whereby the fastener will more readily conform to the contour of the pulley and thus prevent the strain usual and incident to fasteners such as mentioned above and now in general usage.

The inventive idea involved is capable of receiving a variety of mechanical expressions, some of which, for the purpose of illustrating the invention, are shown in the accompanying drawing, in which—

Figure 1 is a plan view of the meeting ends of a belt showing the fastener applied thereto and constructed in accordance with the invention. Fig. 2 is an edge elevation thereof. Fig. 3 is a plan view of a slightly modified form of fastener. Fig. 4 is an edge view thereof. Fig. 5 is a section on the line 5—5 of Fig. 3. Fig. 6 is a plan view of another slightly modified form of fastener. Fig. 7 is a plan view of still another form of fastener, showing the openings therein extending in opposite directions from the openings in Fig. 3, certain of said openings being formed in edges of the fastener.

Referring more particularly to the accompanying drawing in which like reference characters designate similar parts, the numerals 11 and 12 indicate the meeting ends of a drive belt made of any suitable material.

The fastener, which comprises the essential feature of this invention, consists of a plate 13 formed from cast or single sheet metal and slightly bowed, as indicated at 14 in Fig. 4, in order to more readily conform to the contour of the pulley over which the fastener passes. In the modifications shown in Figs. 1 and 3, the plate 13 is provided adjacent each of its transverse edges with a plurality of substantially triangular openings 15 arranged in staggered relation and adapted to receive suitable fastening rivets 16.

Intermediate the transverse edges of the plate 13 the same is provided with a transversely extending corrugation or arched portion 17 which covers the entire width of said plate. The single arched portion, as shown in Fig. 1, is adapted to bridge the meeting ends 11 and 12 of the belt and to impart greatly increased flexibility to the plate adjacent the arched portion or corrugation whereby the strain on the fastener and the belt will be relieved and the fastener more readily conform to the contour of the pulley. In securing the fastener to the meeting ends of the belt the corrugation 17 thereof preferably extends outwardly, as clearly shown in Fig. 2. In Figs. 3 and 4 there is shown a slightly modified form of fastener in which the same is provided with two corrugations 17, instead of one as shown in Fig. 1, the fasteners having two corrugations being preferably adapted for use on belts of medium and light weights. The fasteners shown in Figs. 1 to 4 have their edges turned up as indicated at 18 so that the same will not contact with the belt and damage the same by cutting or otherwise. In Fig. 6 there is shown another slightly modified form of fastener in which the same is provided with diverging slots 19 which are adapted to receive the shanks of the rivets 16, said slots being substituted for the openings 15 shown in the fasteners illustrated in Figs. 1 and 3. This form of the invention is also bowed and includes a corrugation 19' arranged approximately across the middle thereof. The modification shown in Fig. 7 has the openings 15 extending in opposite direction to those in Fig. 3 and certain of said openings are formed in the edges of the fasteners as it has been found, in actual practice, to be convenient and useful to so construct the same.

From the foregoing description taken in connection with the accompanying drawing it will be seen that the invention contemplates providing a belt fastener which is extremely simple in construction, efficient, durable, and which may be manufactured at a minimum cost.

What is claimed is:—

1. A belt fastener comprising a single sheet of metal having a corrugation extending its entire width whereby the resiliency of the fastener is increased, said corrugation being adapted to bridge the meeting ends of a drive belt.

2. A belt fastener comprising a single sheet of metal bowed longitudinally and having a corrugation extending its entire width whereby the resiliency of the fastener is increased, said corrugation being adapted to bridge the meeting ends of a drive belt.

3. A belt fastener plate having openings adjacent its opposite ends for receiving rivets, the outer side walls of said openings diverging toward their respective ends of the plate.

WILLIAM S. LANGFORD.

Witnesses:
 Jos. F. O'Donnell,
 Wm. H. Gough.

Copies of this patent may be obtained for five cents each, by addressing the "Commissioner of Patents, Washington, D. C."